(No Model.)
T. A. EDISON.
SYSTEM OF CONDUCTORS FOR THE DISTRIBUTION OF ELECTRICITY.
No. 264,645. Patented Sept. 19, 1882.
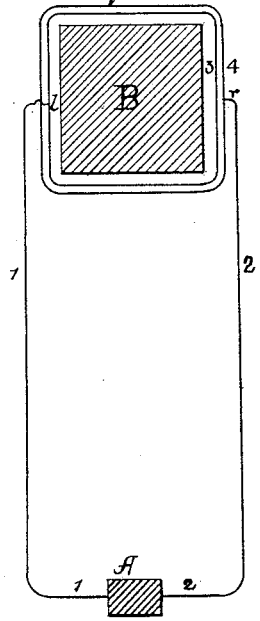
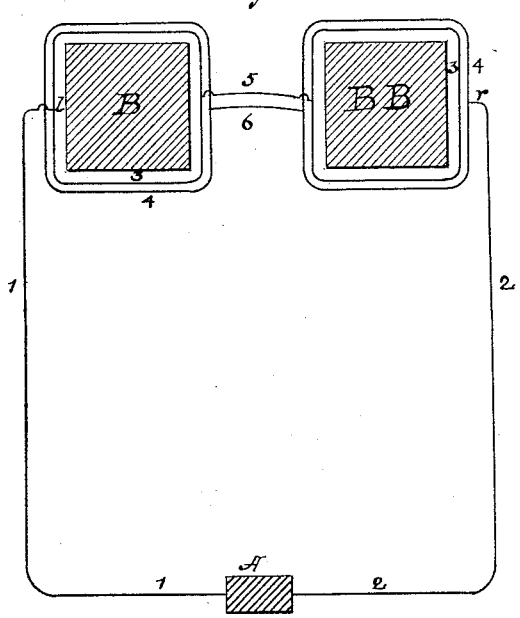
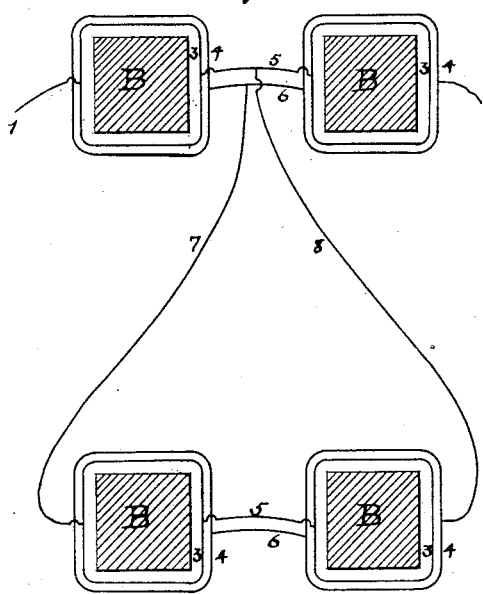
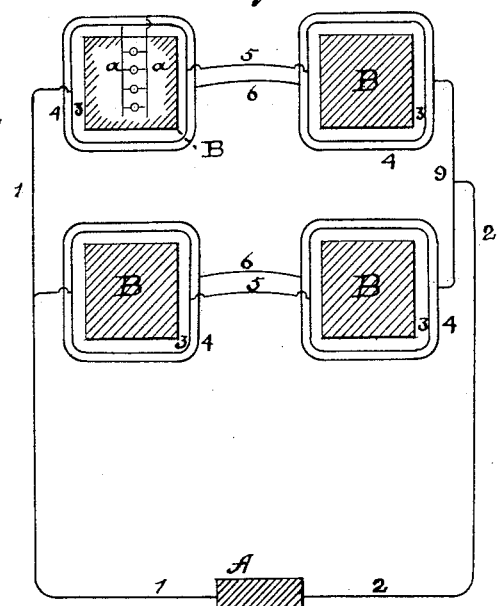
Witnesses.
Chas Raettig
D. D. Mott
Inventor:
T. A. Edison
per Dyer & Wilber
Attorneys.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

SYSTEM OF CONDUCTORS FOR THE DISTRIBUTION OF ELECTRICITY.

SPECIFICATION forming part of Letters Patent No. 264,645, dated September 19, 1882.

Application filed October 7, 1880. (No model.)

*To all whom it may concern:*

Be it known that I, THOMAS A. EDISON, of Menlo Park, in the county of Middlesex and State of New Jersey, have invented a new and useful System of Conductors for the Distribution of Electricity, (Case No. 247;) and I do hereby declare that the following is a full and exact description of the same, reference being had to the accompanying drawings, and to the letters of reference marked thereon.

In my Patent No. 239,147, dated March 23, 1881, is set out the necessity in systems of distributing electricity for conversion into heat and power of the maintenance of an equal pressure or electro-motive force throughout the system, and in such patent is shown a system of laying conductors having this object in view. The invention in this case relates to the same object, and is intended to furnish a system which shall accomplish the same result. In this case two conductors, forming a complete metallic circuit, are laid entirely around each square or block as the service-conductors of such block. Feeding-conductors from the source of electricity lead to and connect with the service-conductors, but upon opposite sides—that is, one conductor (say the one from the + pole) connects at some point to one service-conductor of a block, while the one from the − pole connects to the other service-conductor at a point exactly opposite to the other, so that the terminals of all house-circuits of a block, or the points where the house-circuits connect to the service-conductors, all have the same mass of conductors between them and the central station. A series of blocks may be so arranged, the feeding-conductors leading to the extreme or opposite blocks, one to each of the series, the service-conductors of the blocks being united by cross-conductors, so that each block is distant electrically from the source by the same mass of conductor.

In the drawings, Figures 1, 2, 3, and 4 are diagrams illustrating such system or arrangement of conductors.

A is the central station, at which is located a suitable source of electricity, and from which lead feeding-conductors 1 2.

B represents a block or square, around which are laid the service-conductors 3 4. Conductor 1 leads to 3 at $l$ upon one side of the block, while 2 leads to 4 at $r$ upon the opposite side of the block. The greater portion of any fall of electro-motive force will occur in conductors 1 2, while it will be constant at all points in the service-conductors 3 4, because every point in such conductors is distant from the source by exactly the same mass of conductor, as is evident from inspection of the diagram.

In Fig. 2 two blocks, B and B B, are shown, conductor 1 leading to and connecting with 3 of block B, while 2 leads to and connects with 4 of B B, while cross-conductors 5 6 connect the conductors of the blocks.

In Fig. 3 four blocks are shown, conductor 2 being connected to 4 of the right-hand blocks through a branch, 9, leading to both right-hand blocks, while 1 connects directly to both left-hand blocks. In this figure is shown a house-circuit, $a\,a$, containing lamps (indicated by $o\,o$) placed between $a\,a$.

In Fig. 4 two blocks are connected, as in Fig. 2, while from the cross-conductors 5 6 leads a derived circuit, 7 8, leading to two other blocks arranged as described.

Instead of two blocks, as in Fig. 2, any number may be used.

In all these plans each block and each house-circuit are electrically equidistant from the source, by which uniformity and equality therein are attained, the loss or drop of force occurring in the feeding-circuits.

What I claim is—

In a system of electrical distribution, the combination, with positive and negative service-conductors laid entirely around each block of a district, of feeding-conductors, each connected with one of said positive and negative conductors at points on opposite sides of each block electrically equidistant from the central station, substantially as set forth.

This specification signed and witnessed this 1st day of September, 1880.

THOS. A. EDISON.

Witnesses:
W. CARMAN,
S. MOTT.